Feb. 9, 1965   A. F. SOUTHARD, JR   3,168,941
REPAIR KEY AND METHOD OF CLOSING CRACKS
Filed Nov. 8, 1961
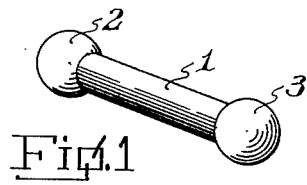
Fig. 1
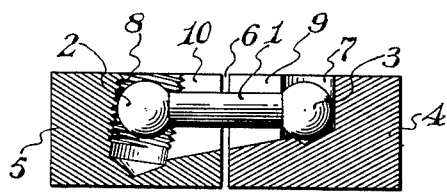
Fig. 2
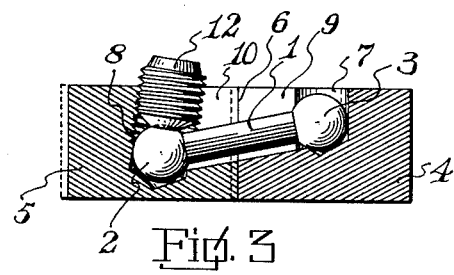
Fig. 3
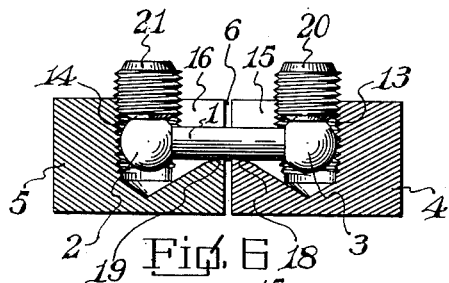
Fig. 6
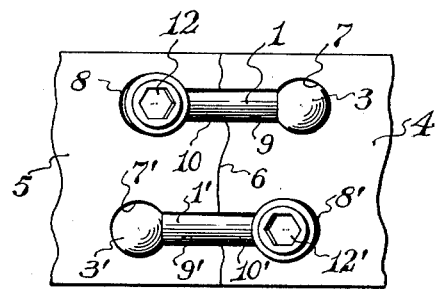
Fig. 4
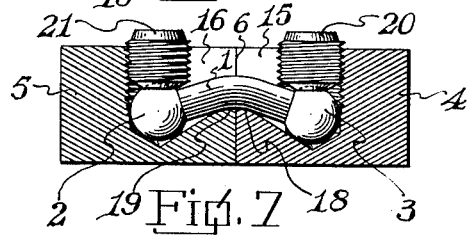
Fig. 7
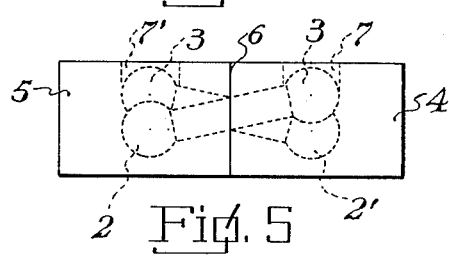
Fig. 5
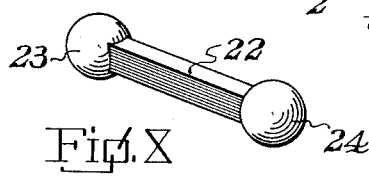
Fig. X
INVENTOR.
Arch F. Southard
BY Rupert J. Brady
ATTORNEY United States Patent Office 3,168,941
Patented Feb. 9, 1965

3,168,941
REPAIR KEY AND METHOD OF CLOSING CRACKS
Arch F. Southard, Jr., 233 W. 8th St., Bristow, Okla.
Filed Nov. 8, 1961, Ser. No. 151,094
4 Claims. (Cl. 189—36)

The invention relates to keys for connecting rigid members and for repairing cracks in rigid members, and to a method of closing cracks in rigid members.

One of the objects of the invention is to provide a construction of repair key which can be utilized in closing a crack in a rigid member.

Another object of the invention is to provide a construction of metal lock which is simple in construction, economical to manufacture, and efficient in use.

Still another object of the invention is to provide a method of arresting cracks in rigid members.

A further object of the invention is to provide a method of closing cracks in rigid members.

Other and further objects and advantages of the present invention reside in the various manners in which the repair key of the invention can be utilized in closing a crack in a rigid member as will become apparent from consideration of the following description taken in connection with the accompanying drawing in which:

FIG. 1 is a perspective view of the repair key of the invention;

FIG. 2 is a transverse sectional view showing one method of interlocking the cracked portions of a rigid member with the repair key of the invention;

FIG. 3 is a tranverse sectional view, similar to FIG. 2, illustrating the manner in which the crack is closed by the key arranged according to the method of FIG. 2;

FIG. 4 is a top plan view of the key and cracked panel member shown in FIG. 3 and particularly showing the manner in which the keys are arranged along the length of the crack;

FIG. 5 is a side elevation view of the cracked panel of FIG. 4, illustrating the alternate arrangement of the repair keys in phantom;

FIG. 6 is a transverse sectional view illustrating another method of interlocking cracked panel portions with the repair key of the invention;

FIG. 7 is a sectional view showing the manner in which a panel crack is closed, using the repair key according to the arrangement shown in FIG. 6; and FIG. 8 is a perspective view showing a modified form of repair key.

Referring to the drawings in greater detail, the repair key of the invention, which is commonly referred to as a metal lock in the trade, is comprised of a shank portion 1, preferably of circular cross section as illustrated in FIGS. 1–7, the shank portion 1 being disposed to interconnect enlarged spherical portions 2 and 3 carried by either end thereof. In FIGS. 2–5, I have illustrated one method of closing a crack in a rigid panel, such as a casting or the like, by use of the repair key of the invention. One portion of the cracked rigid panel is indicated at 4, while the other portion of the cracked rigid panel is designated by reference numeral 5 with the crack to be closed which extends intermediate the panel portions indicated at 6. The rigid panel portions indicated at 4 and 5 may be large expensive metal castings, such as housings for giant turbines, pumps and engines. By use of a plurality of repair keys of the invention, and using the method set forth herein, replacement of the cracked casting is not necessary and the crack can be pulled together while the machine remains in normal operation. It is also to be understood that the substantially rigid panel portions 4 and 5 may also represent building panels and the like, to be joined in edge abutment. Thus the method and key construction of the invention renders a superior and more efficient repair job to cracked castings than has heretofore been possible by closing the crack in the casting and also enables substantially rigid building panels to be arranged in tightly secured edge abutment.

In the method illustrated in FIGS. 2–5 a recess 7 is formed, by drilling or the like, in panel portion 4 adjacent the edge of crack 6. A hole, indicated at 8, is drilled in panel portion 5 adjacent the edge of crack 6 in alignment with the recess 7 in panel portion 4. The hole 8 is drilled at an angle so that the bottom of the bore is directed outwardly from crack 6. Recessed channels 9 and 10 are cut in panel portions 4 and 5, respectively, intermediate recess 7 and hole 8, such that the bottom surfaces of the channels are progressively downwardly sloping, as shown in FIGS. 2 and 3, at 11, from the bottom of recess 7 to the bottom of the deeper hole 8. The spherical portions 2 and 3 of the key are of greater diameter than the shank 1 thereof and the recesses 7 and 8 are drilled to a diameter to receive the spherical portions 2 and 3 of the key, whereas, the recessed channels 9 and 10 are cut to snugly receive the diameter of shank 1 of the key; thus the width of channels 9 and 10 is less than the diameters of recess 7 and hole 8.

The bore of sloping hole 8 is tapped to provide threads on the inner wall of the hole and the key is slipped into the holes so that key portion 3 is disposed in recess 7, key shank 1 is disposed in channels 9 and 10 and sphere portion 2 is disposed in tapped hole 8. For more efficient operation of the key, the distance between the center lines of holes 7 and 8 is preferably slightly less than the distance between the center lines of enlarged spherical key portions 3 and 2.

Similar holes 7 and 8 are drilled alternately on opposite sides of the crack 6 as shown in FIG. 4, for the entire length of the crack, with recessed channels 9 and 10 cut intermediate the holes as shown by the prime numbers in FIG. 4. In this manner the deep threaded holes 8, 8', etc., are not all arranged on the same side of the crack 6 to thus evenly distribute the forces exerted by the keys on the panel portions to overcome the weakening of the casting on one side represented by one of the panel portions which would occur if all of the deep threaded holes were formed in the same panel portion. Therefore, with this staggered arrangement of the deep threaded holes 8, 8', etc., and the shallow recesses 7, 7', etc., the casting or panel portions will be of equal strength on adjacent sides of the crack.

As shown in FIGS. 3 and 4, hollow-nosed set screws, of the Allen type, or the like, as shown at 12, 12', are threaded into the slanted threaded holes 8, 8' after the keys have been inserted therein. As the screws 12, 12' are threaded in, they make contact with the key sphere portions, designated by numerals 2, 2', and by exerting force on the sphere portions gradually force the sphere portions 2, 2' to the bottoms of the deep threaded holes 8, 8', thereby shortening the horizontal distance between the center lines of the spherical key portions 2–3 and 2'–3', causing the spherical portions to exert forces on the panel portions 4 and 5 to draw the panel portions toward one another into abutment to close the air gap of the crack 6. During the take-up operation, the spherical portions 3, 3' pivot within the shallow recesses 7–7', in ball and socket fashion, to enable the key shanks 1, 1' to assume positions at acute angles with the surfaces of the panel portions and in substantial alignment with the sloping bottom surfaces 11 of the recess channels 9–10 and 9'–10'. The crack take-up is indicated by dotted lines in FIG. 3.

In taking up the crack, each set screw 12, 12', etc., along the entire length of the crack is progressively threaded in a small distance, for example, a single turn imparted progressively to each set screw and thereafter again progressively imparting a single turn to each set screw until the edges adjacent the crack are moved into abutment. In performing the take-up of the crack in this manner, the same is pulled together equally over the entire length of the crack, thereby eliminating any excess strain along any portion of the panel portions adjacent the crack.

I have shown a modified method of using the key of the invention to take up a crack in FIGS. 6 and 7. As with the take-up method shown in FIGS. 2–5, it is to be understood that similarly, in the method illustrated in FIGS. 6–7, the keys are placed at set intervals along the entire length of the crack. In this form of the invention two vertical holes 13 and 14 are drilled in the rigid members 4 and 5 at equal distances from the edge of crack 6 and on aligned center lines spaced the distance between the center lines of the enlarged spherical portions 2 and 3 of the key. Recessed channels 15 and 16 have a width to receive the shank 1 of the key and are cut intermediate holes 13 and 14 in alignment with each other. The channels are cut so that they provide diverging bottom surfaces, indicated at 17, sloping downwardly from the edge adjacent the crack at the bottom of the adjacent hole to leave ridge portions 18 and 19 along the edges of the crack. The vertical holes 13 and 14 are threaded and the key is inserted therein in the position shown in FIG. 6. Set screws 20 and 21, having hollow noses or forward faces to engage the tops of key spherical portions 3 and 2, respectively, are threaded into the holes 13 and 14, as shown, until they are disposed in abutment with their respective sphere portion. A plurality of keys are thus disposed in similar manner along the entire length of the crack to bridge the same. The key is constructed of a material which is high in tensile strength so that it will resist elongation, but at the same time is subject to bending forces. With the plurality of keys thus arranged along the crack, a single downward turn is progressively imparted to each set screw on one side of the crack and then a single downward turn is imparted progressively to each set screw along the other edge of the crack, and so on, progressively tightening the screws 20 and 21 in equal steps. The central portion of key shank 1 rests upon the ridges 18 and 19 which act as a fulcrum for the lever formed by the key. As the set screws 20 and 21 are progressively tightened they impart increasing downward forces on the spherical portions on opposite ends of the key shank 1, thereby causing the shank to bend downwardly over the ridges 18 and 19, causing the distance between the center lines of the spherical portions 2 and 3 to be shortened, causing the spherical portions to impart forces to the substantially rigid portions 4 and 5, causing the same to be drawn inwardly toward each other into abutment to close the air space of the crack 6, as shown in FIG. 7. As the distance between the centers of spherical portions 2 and 3 is shortened, the distance between the centers of set screws 20 and 21 is also shortened in direct proportion. With the keys along the length of the crack bent to the position shown in FIG. 7, the crack will be retained in a locked condition.

In FIG. 8 I have shown a modified construction of the metal lock key of the invention wherein the shank portion 22 connecting the enlarged spherical portions 23 and 24 is shown to have a cross section of polygonal shape, preferably square. This construction of key shank provides greater cross sectional area for the same shank width as provided by the construction of key shown in FIG. 1, thus providing greater tensile strength than that provided by the key construction of FIG. 1, and reducing the possibility of elongation of the key when it is subjected to forces for drawing the panel portions together.

While I have described my invention of key construction and the method of connecting substantially rigid panel members and closing cracks in substantially rigid panel members in certain of its preferred embodiments, I realize that modifications may be made in the key structure and in the method of use, and I desire that it be understood that no limitations upon my invention are intended other than may be imposed by the scope of the appended claims.

What I claim as new and desire to secure by Letters Patent of the United States is as follows:

1. A connection for repairing a crack in a metal member comprising, a first bore forming a recessed socket in said metal member adjacent one edge of the crack, a second bore disposed in said metal member adjacent the opposite edge of the crack with said second bore being of greater depth than said first bore and inclined inwardly away from the crack, a recessed channel extending transverse of the crack and interconnecting said first and second bores and having a bottom wall inclined downwardly from said first to said second bore, a rigid key member having enlarged first and second substantially spherical end portions joined by a shank having a width substantially the same as the width of said recessed channel, said first spherical end portions disposed in said first bore, said shank disposed in said recessed channel and said second spherical end portion disposed in said second bore, and lug means threadedly engaging said second bore and adapted to move said second spherical end portion downwardly in said inclined bore away from said crack and pivot said first spherical portion in the socket formed by said first bore to thereby draw together the metal members on opposite sides of the crack.

2. A connection for repairing a crack in a metal member comprising, a pair of bores having substantially parallel axes disposed in said metal members on opposite sides of the crack, a recessed channel extending transverse of the crack interconnecting said pair of bores, said recessed channel having a width less than the diameter of said bores and having bottom wall portions inclined upwardly from said bores to the opposite edges of the crack, a key member having enlarged spherical end portions disposed in said pair of bores and a bendable shank interconnecting said spherical end portions disposed in said recessed channel in contact with said bottom wall portions at the edges of the crack, and lug members threadedly engaging said pair of bores and adapted to move said spherical end portions downwardly in said pair of bores and cause said bendable shank to bend at the crack to draw the metal member on opposite sides of the crack inwardly to close the same.

3. A connection as set forth in claim 2 in which said lug members deform said key member into the shape of an inverted-V.

4. A connection as set forth in claim 2 in which the centers of said spherical end portions are moved from axial alignment with each other and the center line of said shank when said lug members are moved downwardly in said bores.

References Cited in the file of this patent

UNITED STATES PATENTS

| | | |
|---|---|---|
| 207,265 | Forrester | Aug. 20, 1878 |
| 675,106 | Oberle | May 28, 1901 |
| 1,165,155 | Cordes | Dec. 21, 1915 |
| 2,199,694 | Coleman | May 7, 1940 |
| 2,252,986 | Scott | Aug. 19, 1941 |
| 2,420,621 | Ricks | May 13, 1947 |
| 2,951,506 | Diperstein | Sept. 6, 1960 |
| 3,064,321 | Rose | Nov. 20, 1962 |

OTHER REFERENCES

Smooth-On Handbook by Smooth-On Manufacturing Co., Jersey City, N.J., copyright 1924, 20th ed., pages 60 and 61.